US006480593B1

(12) United States Patent
Munday et al.

(10) Patent No.: US 6,480,593 B1
(45) Date of Patent: *Nov. 12, 2002

(54) COMMUNICATIONS SYSTEM AUTOMATICALLY DIVERTING CALLS WHEN USER NOT PRESENT

(75) Inventors: Alan C Munday, Ipswich (GB); Graham J Norbury, Herndon, VA (US)

(73) Assignee: British Telecommunications public limited company, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,779

(22) PCT Filed: Dec. 3, 1997

(86) PCT No.: PCT/GB97/03336

§ 371 (c)(1),
(2), (4) Date: Mar. 30, 1998

(87) PCT Pub. No.: WO98/26566

PCT Pub. Date: Jun. 18, 1998

(30) Foreign Application Priority Data

Dec. 13, 1996 (EP) .............................................. 96309128

(51) Int. Cl.[7] .............................................. H04M 3/42
(52) U.S. Cl. .............................. 379/211.02; 379/201.97; 379/913

(58) Field of Search .......... 379/210.01, 211.01–211.04, 379/212.01, 213.01, 201.01–201.12, 219, 90.01, 102.06, 913

(56) References Cited

U.S. PATENT DOCUMENTS

| 3,673,341 | A | * | 6/1972 | Finkhauser et al. ......... 379/211 |
| 4,661,972 | A | * | 4/1987 | Kai ............................. 379/57 |
| 4,674,115 | A | * | 6/1987 | Kaleita et al. .............. 379/201 |
| 4,932,050 | A | * | 6/1990 | Davidson et al. ........... 379/211 |
| 5,309,511 | A | * | 5/1994 | Kotake ....................... 379/201 |
| 5,369,695 | A | * | 11/1994 | Chakravarti et al. ........ 379/211 |
| 5,394,464 | A | * | 2/1995 | Hanson et al. .............. 379/201 |
| 5,475,737 | A | * | 12/1995 | Garner et al. ............ 379/88.26 |
| 5,481,602 | A | * | 1/1996 | Griffiths et al. ............. 379/210 |
| 5,712,902 | A | * | 1/1998 | Florence et al. ............ 379/202 |
| 5,802,147 | A | * | 9/1998 | Beyda et al. ............... 379/67.1 |
| 5,809,128 | A | * | 9/1998 | McMullin ................... 379/215 |
| 5,867,568 | A | * | 2/1999 | Ackerman et al. .......... 379/201 |
| 5,901,211 | A | * | 5/1999 | Dean et al. ................. 379/211 |
| 6,044,143 | A | * | 3/2000 | Su .............................. 379/225 |
| 6,104,799 | A | * | 8/2000 | Jain et al. .............. 379/211.01 |

* cited by examiner

Primary Examiner—Ahmad F. Matar
Assistant Examiner—Benny Q. Tieu
(74) Attorney, Agent, or Firm—Nixon & Vanderhye P.C.

(57) ABSTRACT

In a communications network (130), call divert, for calls directed to a local telephone (100), from the local telephone (100) to a remote telephone (150) is initiated by a computer system (160) after the user has had no interaction with the computer system for a predetermined period of time. Thus, a user need not remember to initialize call divert manually before leaving the vicinity of the local telephone (100).

8 Claims, 6 Drawing Sheets

COMMUNICATIONS SYSTEM AUTOMATICALLY DIVERTING CALLS WHEN USER NOT PRESENT

BACKGROUND AND SUMMARY OF INVENTION

The present invention relates to apparatus and methods for controlling communications networks, and routing therefor. Particularly, but not exclusively, the present invention can be employed to control call divert or data transfer in a communications network.

Call divert, also known as call forward or call re-direct, is a facility available in most modern telephone networks and on most modern PABXs Iprivate automatic branch exchanges) which allows a party to re-direct calls, directed to a first telephone, to a second telephone or other type of communications terminal. In the BT public switched telephone network (PSTN), for example, call divert can be initiated from a telephone by lifting the receiver and entering "*21*" followed by the telephone number to which the calls are to be diverted and then "#". This series of key strokes has the effect of diverting all calls directed to the telephone to a different telephone having the telephone number provided. To remove the call divert, it is a simple case of lifting the receiver of the diverted telephone and entering "#21#". Other telephone operators and communications networks offer similar services.

For the purposes of the present description, first or "local" telephone will be used as a convenient description for any telephone, or other communications terminal for which incoming calls can be diverted to a second or "remote" telephone (or other communications terminal). An example of another type of communications terminal is a facsimile machine. Typically, but not always, "local" would imply equipment located at a party's home or in his normal, immediate office environment.

Originally, call divert was typically controlled in a PSTN, at a local exchange to which the local telephone was connected, by 'looping' calls received for the local telephone to a remote telephone connected to a remote exchange. Thus, a re-directed call would in fact comprise two calls: one to the local exchange and one from the local exchange to the remote exchange. More recently, some telephone networks incorporate a level of intelligence which detects that a call is to be re-directed and instructs the originating exchange to connect with the remote exchange directly, thus bypassing the local exchange completely. Such 'intelligent networks' employ various techniques to control calls in this way which have been widely reported and are thus not described in more detail in the present description.

Obviously, call divert is a useful service to enable a party to redirect his calls in the event the party is away from the telephone. To take advantage of the service, the party will need both to know the telephone number of a remote telephone (fixed or mobile), available for use away from the local telephone, and to remember to initiate call divert at the local telephone.

A problem therefore arises if the party forgets to initiate call divert before leaving his local working area.

Some telephone systems provide a function, sometimes know as "follow-me", which allows a party to control call divert for his local telephone from a remote telephone. This overcomes the problem of forgetting to initiate call divert in the first place, but does not solve the problem of when the party forgets entirely to initiate call divert.

In accordance with a first aspect, the present invention provides a call control apparatus comprising: inference means for inferring the absence of a party from the vicinity of a piece of user equipment, said inference means including a timer and being arranged to infer user absence by the lack of user interaction with the piece of user equipment for longer than a pre-determined period of time; and control means being responsive to said inference means such that inference of user absence from the vicinity of said piece of user equipment causes a call made to a first communications terminal to be re-directed to a second communications terminal.

One advantage of the invention is that a party need not remember to initiate call divert when the party leaves, for example, his desk.

Advantageously, the user equipment may be a computer system and the inference means may include a screen-saver process performed by said computer system. That is to say, when the computer is idle for the pre-determined period of time, the process infers that the party is absent and initiates call divert irrespective of whether in fact the party is present or absent.

This arrangement would be particularly advantageous, for example, for a party who works predominantly at the computer whilst in his local environment, but who also may be called away from his local environment on occasion. Such a party might be, for example, a computer network support specialist who is able to control most network functions from his own computer terminal but who needs at times to visit remote terminals or equipment to investigate certain other network problems which might arise.

In some embodiments, the second communications terminal might be, for example, a mobile telephone. Advantageously, a party will receive his redirected calls substantially wherever the party is, whenever the party is away from his normal working environment and is carrying the mobile telephone.

In accordance with a second aspect, the present invention provides a method of re-directing calls comprising: inferring the absence of a user from an area by detecting the lack of user interaction with a piece of user equipment; and re-directing calls made to a first communications terminal situated in or near said area, in response to an inferred absence, from the first communications terminal to a second communications terminal.

In accordance with a third aspect, the present invention provides a data transfer system comprising: inference means to infer the absence of a user from an area, said inference means including timer means and being arranged to infer user absence by the lack of user interaction with a piece of user equipment for longer than a pre-determined period of time; and control means being responsive to the inference means such that inference of user absence from the vicinity of said piece of user equipment causes, in use, a transfer of data previously directed to a first communication& terminal in or near said area to be redirected to a second communications terminal.

Whereas the first aspect of the invention relates typically to conditions where an end-to-end call is established to provide, for example, a speech path, the third aspect relates in general to conditions where data transfer from one location to another does not necessarily use an end-to-end connection. For example, the third aspect might relate to packet-switched data, or to store and forward type data such as electronic mail (email) which might only be delivered to the intended destination minutes or hours after being sent.

For the use of email, the owner of an email address can typically manually re-direct incoming mail by signalling to a respective email server, or email post office, that incoming emails should be sent elsewhere. This facility might be used to re-direct emails when the said owner is on holiday, for example, and wants emails read and acted on by someone else if necessary. Such a facility can be controlled in accordance with embodiments of the invention, to re-direct email to another party's email system when the owner is away from his office, using the detection and control methods described above.

Embodiments of the present invention will now be described, by way of example only, with reference to the accompanying drawings, of which.

SUMMARY OF THE INVENTION

DETAILED DESCRIPTION OF THE INVENTION

Figure 1:
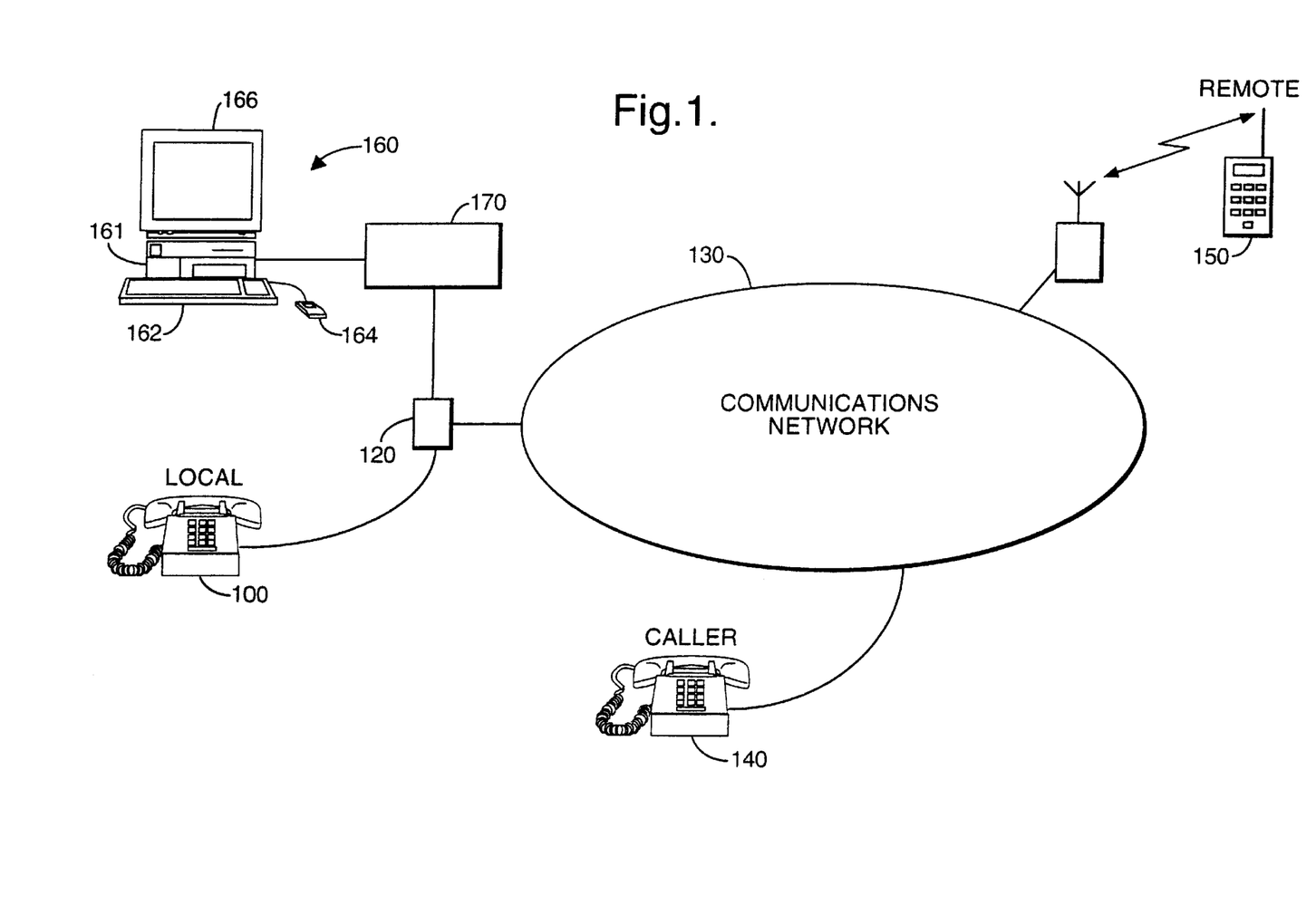
FIG. 1 is a diagram which illustrates apparatus arranged to carry out an embodiment of the present invention.

According to FIG. 1, a scenario incorporating an embodiment of the present invention includes a local telephone 100 connected to a telephone network 130 via a wall socket 120. The configuration of the communications network 130 is not shown since it is not relevant to the operation of the present invention. This representation of the network 130 is intended to depict any type of communications network including, for example, a local, private, national, or even an international network, which provides a call divert facility. For the present embodiment, however, the network is assumed to be a PSTN.

Also shown connected to the communications network 130 is a telephone 140, designated as a caller telephone, and a mobile telephone 150, designated as a remote telephone.

Connected in parallel with the local telephone 100, to the wall socket 120, is a computer system 160. The computer system 160 comprises the standard features of: a computer 161; a keyboard 162; a mouse 164; a VDU 166; and a modem 170 which connects the computer to the wall socket 120 and thus to the network 130. The computer system 160 is, for example, an IBM-compatible Personal Computer (PC).

The computer system 160 might alternatively initiate call divert via one or more other devices having a connection with the communication network. In this case the computer system 160 might not have its own direct communications network connection. The computer system 160 may be networked in a local area network (LAN) and be connected to the communications network via, for example, a server which is connected by an appropriate means to the communications network.

The present embodiment is enacted as a process, or processes, running on the computer 161. Conveniently, since typically computer systems offer multi-processing operating environments (for example in the form of a Windows (TM) graphical user environment), the present embodiment can operate as a background, or transparent, process which is substantially hidden from a user of the system, who may be running and using one or more other process concurrently.

Figure 2A:
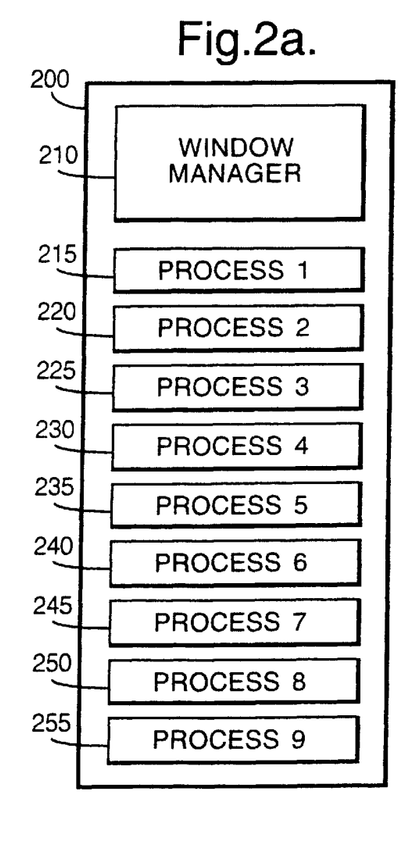
FIG. 2 is a diagram which represents concurrent processes running in a computer system.

FIG. 2a illustrates a logical process flow for the processes 200 running on the computer system 160 in FIG. 1. The processes are each in turn allocated periods of time, for example 20 ms long, during which time the computer system 160 carries out any operations required by the process. This provides the effect to a user of the computer system 160 of the computer system being a multi-processing system.

Figure 2B:
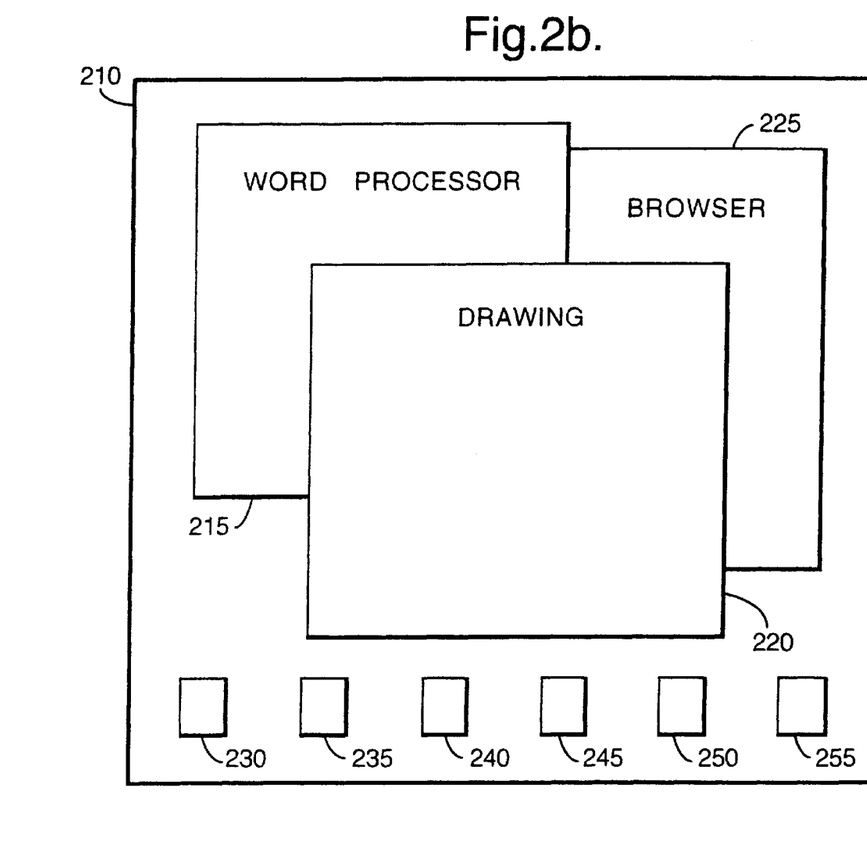

In FIG. 2b the processes 200 are illustrated as running under the control of a windowing graphical user environment. The processes 200 comprises a window manager process 210 and other processes 215 to 255 which run under the control of the window manager process. The window manager process 210, among other things, makes available to the other process information concerning user interactions with the computer system 160, including keyboard and mouse interactions. Thus, a word processing process, for example, obtains the information which it needs about which keys a user types from the window manager process 210.

Process 1, process 2 and process 3 represent foreground processes running on the computer system 160. "Foreground" typically implies that a user has initiated the process at some time and can interact with it. For example, process 1 might be a word processing package, process 2 might be a drawing package and process 3 might be an Internet browser.

Process 4, process 5 and process 6 are background processes which are substantially transparent to a user. For example, process 4 may be a print-server, which controls all printing processes from any other process, process 5 might be a screen-saver, which turns the display screen blank when the system has been unused for a period of time (for example, ten minutes), and process 6 might be an email system for receiving incoming email. Under normal circumstances, these processes do not require user interaction, and are transparent to the user, apart from maybe providing an 'icon' representing each process. However, typically, user-configurable interfaces are provided to enable the user to interact with the processes for configuration purposes, for example, to change the screen-saver time period.

In the present embodiment, process 7, which is substantially a background process, controls call divert. The process is a software routine written, for example, in the Visual C++ (version 1.51, 16-bit) programming language, running under Windows NT version 4.0.

Figure 3:
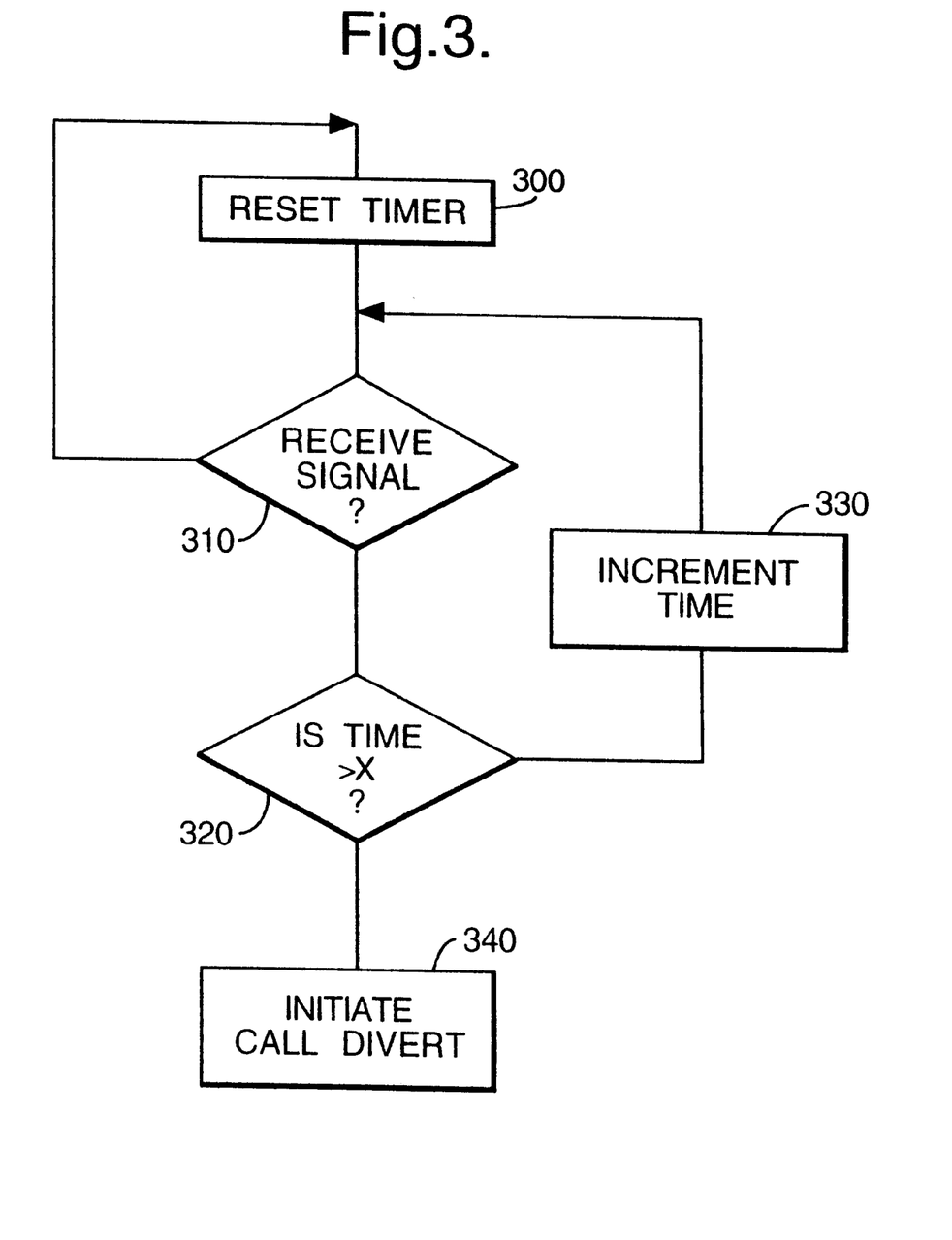
FIG. 3 is a flow diagram of a process to initiate call divert.

A simple flow diagram representing process 7 is shown in FIG. 3. In step 300, a timer is reset to zero. In step 310, a check is carried out to determine whether user interaction with the computer system 160, for example via detection of keyboard or mouse activity, has occurred since the timer was reset.

If an interaction has occurred, then the process branches back and the timer is reset again, in step 300. If no user interaction is detected then in step 320 the value of the timer is compared with a predetermined value x. If the time is not greater than the value x (for example 2 minutes) then the process branches back and in doing so, in step 330, the timer value is incremented. In this embodiment, the timer values are incremented in line with the computer system clock.

If the counter time is greater than the value x, then a signal is provided to indicate to the next process, process 8, that call divert should be initiated, in step 340.

Figure 4:
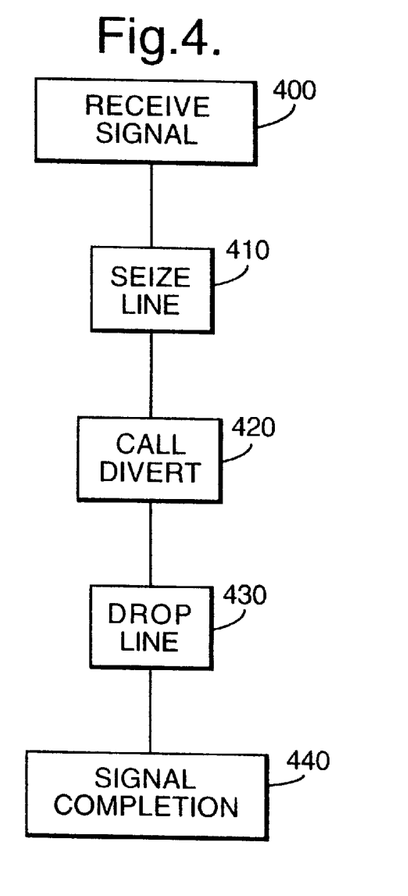
FIG. 4 is a flow diagram of a process to enact call divert.

Process 8, for initiating call divert, will now be described with reference to FIG. 4. According to FIG. 4, the process awaits a signal from process 7 to initiate call divert, in step 400. When a signal is received, the process issues a command, in step 410, to the modem 170 to seize the telephone line. Then, in step 420, the modem is commanded to dial the code appropriate to initiate call divert, for example "*21*1234567#". Then, in step 430, the modem is commanded to drop the telephone line. In this embodiment, the number to divert to, 1234567, is that of the remote, mobile telephone 150. Finally, in step 440, process 8 signals to process 7 that the operation has been completed.

In addition to the processes described above, when the computer 161 has been idle for a time longer than x and call divert has been initiated accordingly, a further process is arranged to remove call divert as soon as the user interacts with the computer 161 by, for example, typing at the keyboard 162 or moving the mouse 164.

The modem described above, of course, could be replaced by any other means for generating DTMF (dual-tone, multi-frequency) tones, which would typically be necessary to control call divert in an analogue communications access network, for example a PSTN.

In the event the communications network supports digital access, for example ISDN access in a PABX network, call divert might be controlled using digital signals passed across the D, or signalling, channel of the 2B+D (two bearer+ signalling) capability. Thus, call divert control would not require a modem per se but, instead, would require a suitable ISDN interface in the computer. Modem and ISDN control processes and software therefor are commercially available products and, as a such, will not be discussed in detail in this description. Indeed, some computer operating systems, for example Windows NT (TM), include the functionality required to control many different types of communications interface. If required, modem control processes could be written in software using, for example, the CrossTalk (TM) modem script language, or the Procomm (TM) script language.

In the present embodiment, which relates particularly to a Windows (TM)-based system, call divert is triggered by a response to an application programming interface (API) call, which is normally used by screen-saver processes. The appropriate API call, including a specified inactivity time, from a software process, generates a return signal to the software process when there has been no user activity for the specified inactivity time. Thus, a single API call in effect enacts steps 300 to 330 of FIG. 3.

Figure 5:
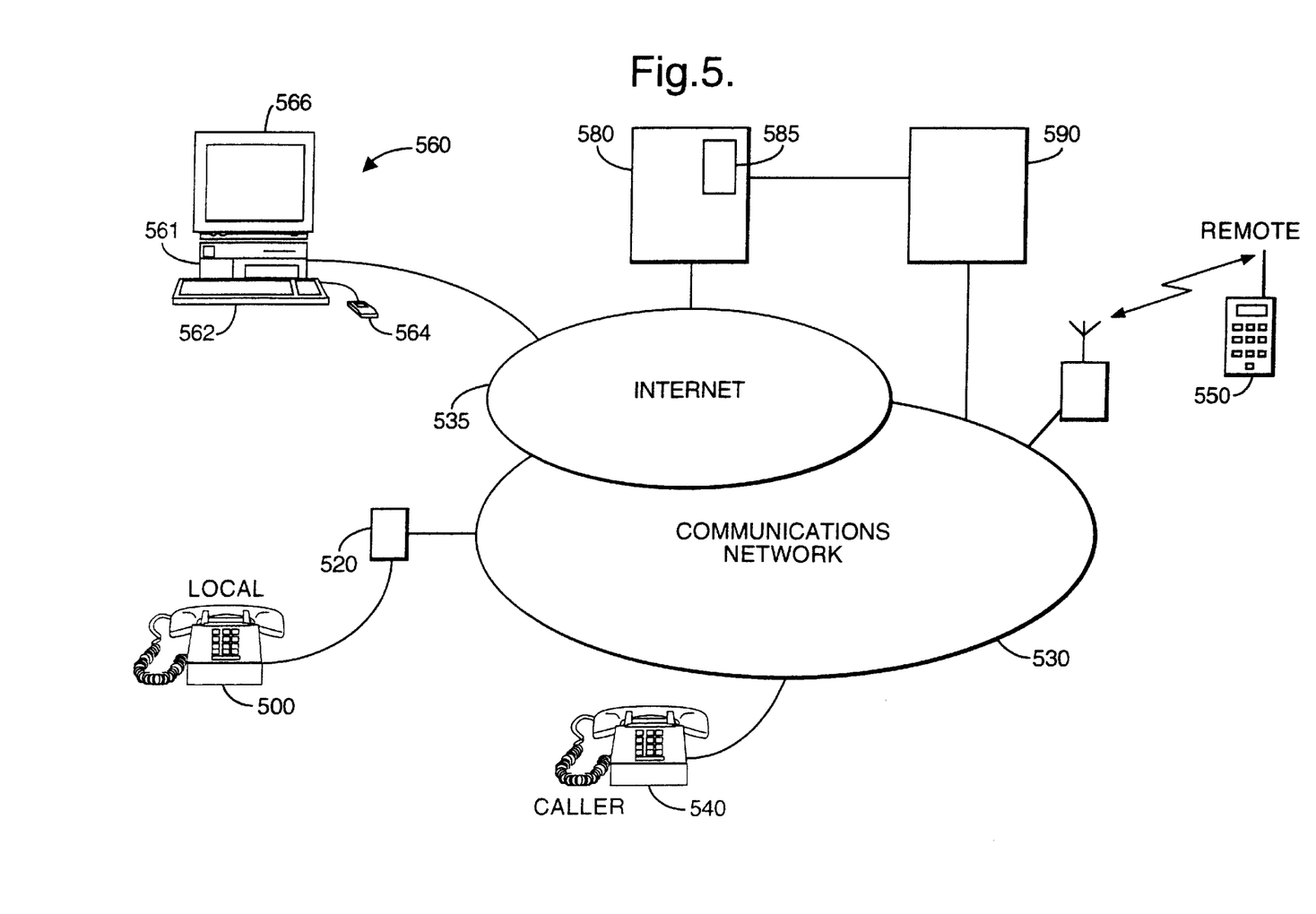
FIG. 5 is a diagram which illustrates apparatus arranged to carry out an alternative embodiment of the present invention, employing the Internet to carry control signals.

FIG. 5 illustrates an alternative embodiment of the present invention. In FIG. 5, components which are equivalent to components shown in FIG. 1 are indicated by the same reference numeral increased by 400. The main difference between the embodiment in FIG. 1 and the embodiment in FIG. 5 is that the computer system 560 in FIG. 5 is connected, via a modem (not shown) to the Internet 535. Although the Internet 535 and the communications network 530 are represented as two separate networks, this representation is for the purposes of clarity only, the skilled person appreciating that an Internet connection, in practice, is usually made across a normal communications network. Also, whilst in this example the Internet is used, it is clear that other network types could be used. Again, however, the communications network in this embodiment is assumed to be a PSTN.

The computer system 560 is able to connect, via the Internet 535, to an Internet server 580. The Internet server in turn is connected by an appropriate communications link to a network control platform (NCP) 590. The NCP 590 is a computer system connected to the communications network 530 which is provided with network management functionality. In particular, the NCP 590 has functionality to control call divert for telephone apparatus connected to the network.

Figure 6:
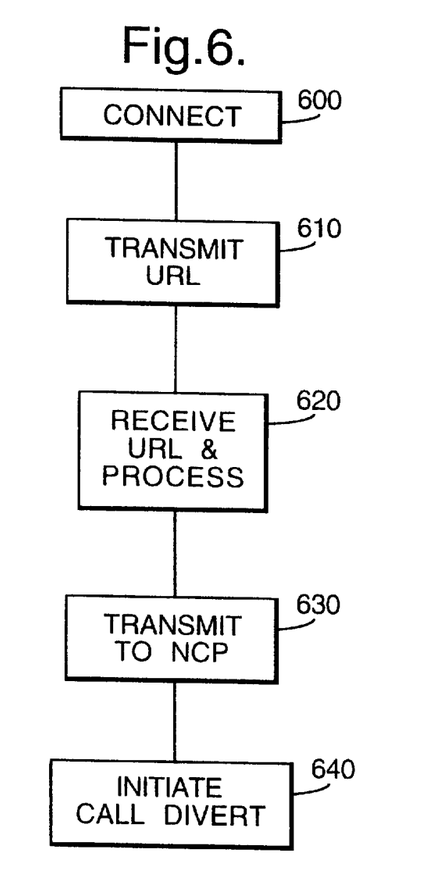
FIG. 6 is a flow diagram of a process to enact call divert for the embodiment of FIG. 5.

The call divert procedure for this embodiment will now be described with reference to FIG. 6, which is an alternative call divert control procedure to that described above and illustrated in FIG. 4.

When call divert is initiated (for example, by step 340 in FIG. 3) the computer system 560 connects to the Internet in step 600 (if it is not already connected). The connection is made via a dial-up link with a computer system (not shown) connected to the Internet. Alternatively, the computer system 560 itself may be connected directly to the Internet.

Next, a message, including the name of a control process 585 accessible on the Internet server 580, is transmitted to the Internet server in step 610. The message is transmitted in standard TCP/IP format to a port on the server 580 which recognises World Wide Web (Web) Internet service requests. The message is sent as an HTTP (HyperText transfer protocol) POST method. The message, which for the purposes of the present embodiment includes as parameters the telephone numbers of the local telephone 500 and of the remote mobile telephone 550, activates the process 585. The process 585 is embodied as a CGI (common gateway interface) script written in the C programming language which is stored on the server 580 and which controls communications with the NCP 590 appropriately.

In step 620, the Internet server 580 receives the message and initiates the control process 585. The process 585, in step 630, transmits the telephone number information to the NCP 590, in a pre-determined format.

Subsequently, in step 640, the NCP 590 receives the formatted information and controls the communications network 530 to initiate call divert to re-direct all calls intended for the local telephone 500 to the remote telephone 550.

Of course, different Internet, or indeed other services and protocols could be employed to achieve the same effect.

Further information relating to the Internet, Internet services and protocols is provided in "Managing Internet Information Services", by Cricket Liu et al, published by O'Reilly & Associates, Inc. (ISBN 1-56592-062-7).

The skilled person will appreciate that the present invention relies neither on the type of communications network nor on the type of computer system used. The computer may be connected, via a modem, to the network itself to initiate call divert. Alternatively, the computer may be connected to another network controlling means, for example via the Internet, which controlling means is itself connected to the communications network and can initiate call divert. Indeed, the present invention may be implemented directly or indirectly, within the scope of the present invention, with any communications network which provides the facility for calls to be re-directed.

Figure 7:
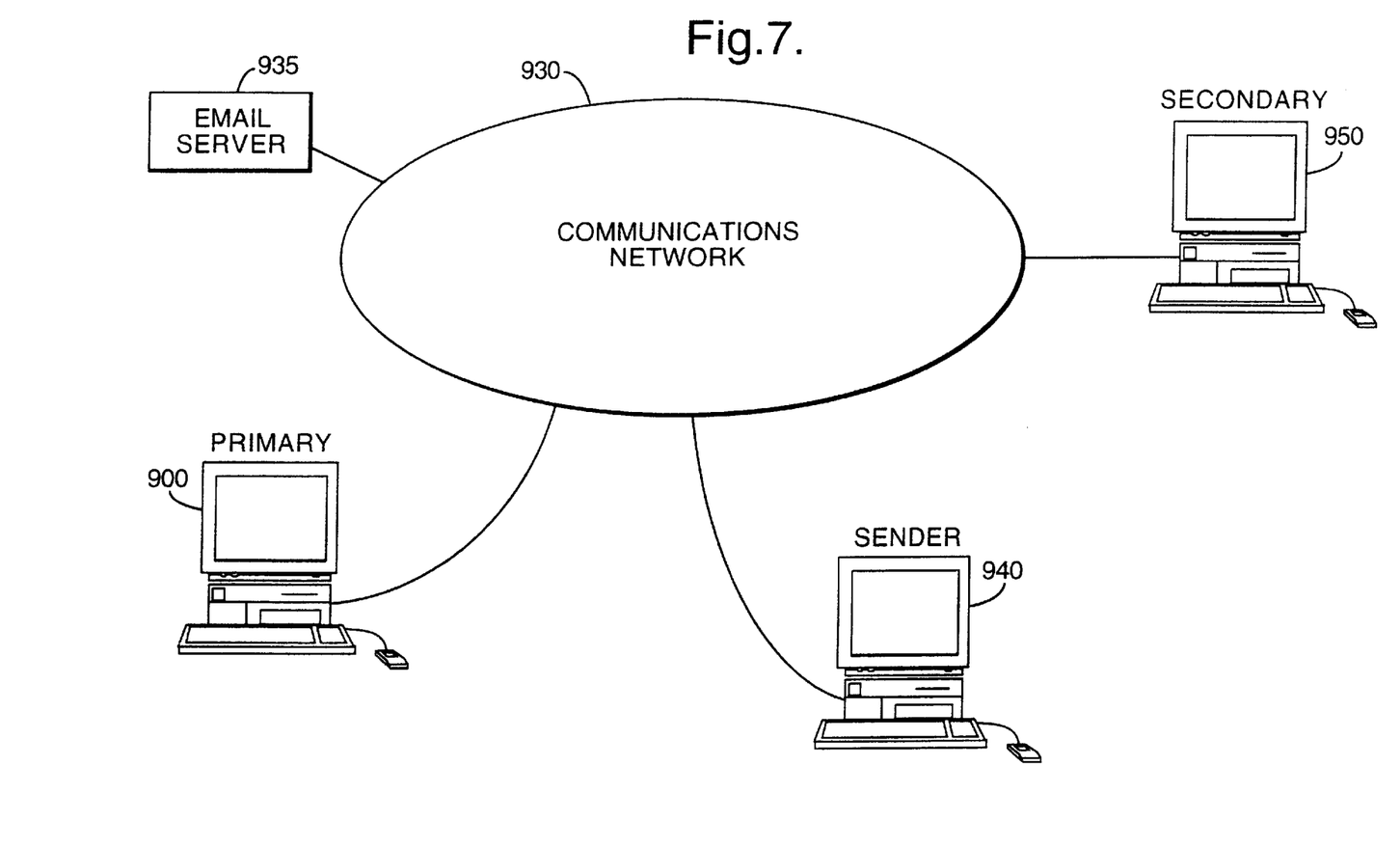
FIG. 7 is a diagram which illustrates apparatus arranged to carry out a further embodiment of the present invention.

Although the embodiments described above concentrate on telephone call divert, it is envisaged that the same principles may be applied to other forms of communications network service. For example, as illustrated in FIG. 7, the invention may in some embodiments be applied to electronic mail delivery, where electronic mail from a sending terminal 940 is automatically re-directed to a secondary terminal 950 from a primary terminal 900. One scenario where this might be appropriate is when a manager is out of the office and electronic mail messages are diverted to an assistant.

As illustrated in FIG. 7, an email server 935 is attached to a network 930 and receives emails sent by the sending terminal 940. The communications network in this case comprises an ethernet local area network supporting the TCP/IP protocol for accessing devices attached thereto.

The email server 935 itself is a Unix-based computing platform running appropriate email server software. The primary 900, secondary 950 and sender 940 terminals are all IBM-based PCs running appropriate email software such as Microsoft MS-mail modified appropriately to support mail forwarding.

The email diverting process is substantially the same as that described in relation to FIG. 1. The difference lies mainly in the fact that the PCs each have an ethernet interface and communicate directly with the ethernet communications network 930.

Also, the control process which runs on the primary terminal 900, on detecting a presence or absence, generates a message for the email server 935 to route any emails intended for the primary terminal 900, for example from the sending terminal 940, to the secondary terminal 950. Software to operate call forwarding in this way is commercially available.

It will be appreciated that the invention may also be embodied in control means of the PSTN such that in the absence of calls from a particular telephone number for a pre-determined period control means of the network causes call diversion to an alternative pre-determined destination.

Alternatively or additionally, in the absence of a call answer on an incoming call offered to the local telephone, call divert until next use of the local telephone may be applied.

A simplified divert procedure can also be used such that more complex arrangements (such as time of day, day of week dependent duration) can be effected. In such cases, a predetermined control signal from the telephone or connected computer or detected system may be transmitted to control means of the network, the network effecting call diversion in accordance with pre-programmed arrangements.

In a more complex divert arrangement, the network or PBX control means may take account of other call diversions already in operation such that if a remote telephone to which divert would normally be effected is itself already diverted on fall-back to an alternative divert destination may be made.

What is claimed is:

1. Call control apparatus comprising:

inference means for inferring an absence of a user from the vicinity of user equipment, said inference means including a timer and being arranged to infer user absence by a lack of user direct interaction with the user equipment for longer than a pre-determined period of time; and control means being responsive to said inference means such that inference of user absence from the vicinity of said user equipment causes a call subsequently made to a first communications terminal after the absence of a user has been inferred to be re-directed to a second communications terminal.

2. Call control apparatus as claimed in claim 1 wherein the user equipment is a computer system.

3. Call control apparatus as claimed in claim 2, wherein said inference means includes a screen-saver process performed by said computer system.

4. Call control apparatus as claimed in claim 1 wherein the control means includes means for transmitting a control signal to a communications network to initiate call re-direction.

5. A method of re-directing calls comprising:

inferring the absence of a user from an area by detecting a lack of user direct interaction with user equipment; and re-directing calls subsequently made after the absence of said user direct interaction has been inferred to a first communications terminal situated in or near said area, in response to an inferred absence, from the first communications terminal to a second communications terminal.

6. A data transfer system comprising:

inference means to infer an absence of a user from an area, said inference means including timer means and being arranged to infer user absence by a lack of user direct interaction with user equipment for longer than a pre-determined period of time; and control means being responsive to the inference means such that inference of user absence from a vicinity of said user equipment causes, in use, a transfer of data subsequently directed after the absence of a user has been inferred to a first communications terminal in or near said area to be re-directed to a second communications terminal.

7. A data transfer system as claimed in claim 6, wherein the user equipment is a computer system.

8. A data transfer system as claimed in claim 7, wherein said inference means includes a screen-saver process performed by said computer system.

* * * * *